United States Patent [19]

Koga et al.

[11] Patent Number: 4,713,405

[45] Date of Patent: Dec. 15, 1987

[54] α-CYANOACRYLATE ADHESIVE COMPOSITION OF MATTER

[75] Inventors: Mitsuyuki Koga; Kenichiro Hirai; Toshio Sugimae; Setsuo Fukushige, all of Sakura, Japan

[73] Assignee: Koatsu Gas Kogyo Co., Ltd., Osaka, Japan

[21] Appl. No.: 879,380

[22] Filed: Jun. 27, 1986

[30] Foreign Application Priority Data

Jul. 19, 1985 [JP] Japan .................................. 60-160903

[51] Int. Cl.$^4$ ........................... C08K 9/04; C08K 5/55
[52] U.S. Cl. .................................... 523/212; 524/183; 524/333; 524/701; 524/850
[58] Field of Search ................. 523/212; 524/333, 701, 524/850, 183

[56] References Cited

U.S. PATENT DOCUMENTS 4,477,607 10/1984 Litke .................................... 523/212

OTHER PUBLICATIONS

Japio Derwent Abs 82-036168, Showa Electric, Morita et al., J57036168, Feb. 26, 1982.
Japio Derwent Abs 82-023699 Showa Electric, Morita et al., J57023629.
Derwent ABS 80-58877C/34 Haubennest et al., DE2905879, (Aug. 14, 1980), BYK-Mallinckrodt CH.

*Primary Examiner*—Herbert J. Lilling
*Attorney, Agent, or Firm*—Koda and Androlia

[57]     ABSTRACT

An α-cyanoacrylate adhesive composition of matter consisting essentially of α-cyanoacrylate, fumed silica treated on the surface with dimethyldichlorosilane, and trialkyl borate, the trialkyl borate being expressed by the general formula $B(OR)_3$ wherein R represents any alkyl groups having carbon numbers 1 through 18. Although to this composition of matter, improved thixotropy high in stability are obtained and significant improvements are effected not only in the ineffectiveness of workability but in the restrictions on the range of work which were both problems of conventional adhesives.

4 Claims, No Drawings

α-CYANOACRYLATE ADHESIVE COMPOSITION OF MATTER

BACKGROUND OF THE INVENTION

1. Field of the Invention

This invention relates to an α-cyanoacrylate adhesive composition of matter excellent in storage stability and high in viscosity and having a thixotropy.

2. Prior Art

α-cyanoacrylate is a compound expressed by the general formula:

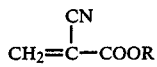

wherein R represents alkyl, allylalkyl, aralkyl, haloalkyl, cyclohexyl, phenyl groups and has a property susceptible to anionic polymerization and liable to be polymerized and set within a very short time of several seconds to several minutes at a normal temperature without using a catalyst by the anionic active factor in the moisture on the surface of a solid, humidity in the atmosphere, and alkaline substances. Because of the property described, the α-cyanoacrylate adhesive composition finds wide application both in industrial use and in home use for adhesion of rubber, metal, glass, plastic, wood, ceramic, etc.

Because almost all α-cyanoacrylate adhesives are low in viscosity, they have not only the disadvantage that when applied to a vertical surface, they hang from the surface, or when applied to a porous material, they are sucked in the material, but also the disadvantage that they are not stringing (roping) from the adhesive applied surface. In other words, there was formerly no such composition of matter as α-cyanoacrylate superior in workability and having substantial thixotropy.

Generally, the fact that a substance has a thixotropy means that the substance becomes low in viscosity under high shearing and becomes high in viscosity under low shearing but the thixotropy constitutes an important factor in determining workability when a liquid material such as an adhesive and paint is handled. Therefore, it has long been desired to develop an α-cyanoacrylate adhesive superior in storage stability and high in viscosity and having a thixotropy.

In view of the circumstances above, it was recently proposed in U.S. Pat. No. 4,477,607 that hydrophobic fumed silica (of ultramicro particle powder) having a surface treated with a trialkoxyalkylsilane be added to α-cyanoacrylate, but as shown in the examples to be later described, the stability of the proposed invention at a temperature of 70° C. keeps effective for five days and has not yet been sufficiently improved in thixotropy.

SUMMARY OF THE INVENTION

The present inventors have made various researches on further improvements in the problems above and has found that addition of trialkyl borate compound to the initial addition of the fumed silica to α-cyanoacrylate provides in α-cyanoacrylate compound improved in stability and having high viscosity and high thixotropy and which, when applied to a vertical surface or to a ceiling surface, does not "hang" from the surfaces nor strings during its application to the surface and is superior in workability. The invention is based on this finding.

DETAILED DESCRIPTION OF THE INVENTION

The α-cyanoacrylate usable in the invention belongs to the compound represented by the general formula above and is well known as a stabilizer. In short, $SO_2$, $SO_3$, para-toluenesulfonic acid, methanesulfonic acid, sultone, boron-trifluoride ether, etc. may be used. Hydroquinone, benzoquinone, catechol, alkylphenol may be used as a polymerization inhibitor.

Besides, addition of polymer, oligomer, for example, polymethyl methacrylate, polyvinyl acetate, polystyrene, poly α-cyanoacrylate, polyethylene glycol, polymethyl vinyl ether, etc. is possible as a thickener (thickening agent). Further, as the case may be, it is also possible to add a solvent, plasticizer, accelerator for polymerization, coloring agent, etc. which does not reduce the physical properties of nor spoil the storage stability of the α-cyanoacrylate composition.

In addition to the thickener composed of any of the above substances, an inorganic substance is also known.

The use of the fumed silica as a thickener thixotropizing agent, and gelling agent for a liquid substance is not limited to the case of the α-cyanoacrylate but is widely used in an epoxy adhesive, silicon sealing agent, coating material, etc.

The trialkyl borate compound used in the invention is represented by the general formula $B(OR)_3$ wherein R represents an alkyl group having carbon numbers 1 through 18 and the amount of trialkyl borate compound contained in the invention is 0.01–10% by weight (the term "by weight" is applicable hereinafter) and preferably 0.1–5%. This material is supposed to increase viscosity by its reaction with the silanol group on the surface of silica in an adhesive but is not certain. Improvements in the storage stability is supposed to be due to the action of this material as an acid and to the reduction in water content caused by the reaction of the material with the water in the adhesive. The significance of stability is decreased when the content of the trialkyl borate compound is smaller than 0.01%, while on the other hand, an excess of the compound over 10% provides no improvement in stability. As a fumed silica used in the invention is 5–15% of the silica having its surface treated with a dimethyldichlorosilane (for example, made by Degussa AG, West Germany under the tradee name of AEROSIL R 972 or R 974 or R 976) is used for increasing viscosity stability. An amount of not more than 5% does not attain significance of increasing viscosity while an amount of not less than 15% provides a possibility of exceeding the range of viscosity of practical use of 100,000 CPS, and 15% is a limit.

The adhesive composition of matter of the invention obtained in the manner described above shows an excellent adhesion speed, adhesion strength, and storage stability of the α-cyanoacrylate adhesive. Since the composition of matter has high viscosity and thixotropy, it excels in workability and is high in the value of practical use.

PREPARATION OF SAMPLES

TABLE 1

(units in the table represent parts by weight and the same applies hereinafter)

| Cyano-acrylate | Cyanon 5 MSP | 100 | 100 | 100 | 100 | 100 | 100 | 100 |
|---|---|---|---|---|---|---|---|---|
| Fumed silica | Aerosil 200 | 10 | | | | | | |
| | R 202 | | 10 | | | | | |
| | R 812 | | | 10 | | | | |
| | R 972 | | | | 10 | | | |
| | R 974 | | | | | 10 | | |
| | Cab-O-Sil M-5 | | | | | | 10 | |
| | Cab-O-Sil N70-TS | | | | | | | 10 |
| Physical properties | Stability at 70° C. (day) | 3 | 5 | 3 | 10 | 10 | 5 | 5 |

NOTES (1) Cyanon 5 MSP

This is a product sold by the applicant company and consisting of 90 parts of ethyl α-cyanoacrylate, nine parts of polymethyl methacrylate, one part, in total of polymerization inhibitor, stabilizer and accelerator for polymerization.

(2) Aerosil R 200

A product by Degussa AG., West Germany under the above trade name and consisting of fumed silica of 200±25 m²/g in specific surface area.

(3) R 202:

A product sold by the same company under the trade name and consisting of fumed silica of 200±30 m²/g in specific surface area and treated with silicon oil.

(4) R 812:

A product sold by the same company under the trade name and consisting of fumed silica of 200±30 m²/g in specific surface area and treated with hexamethyldisilazane.

(5) R 972:

A product sold by the same company under the trade name and consisting of fumed silica of 110±15 m²/g in specific surface area and treated with dimethyldichlorosilane.

(6) R 974:

A product sold by the same company under the trade name and consisting of fumed silica of 170±15 m²/g in specific surface area and treated.

(7) Cab-O-Sil M-5:

A product sold by Cabot Company U.S.A. under the trade name and consisting of fumed silica of 200±25 m²/g in specific surface area and treated.

(8) N 70-TS:

A product sold by the same company under the trade name and consisting of fumed silica of 100±20 m²/g in specific surface area and treated.

TEST

Various kinds of fumed silica, as shown in Table 1, was mixed with CYANON 5 MSP consisting primarily of ethyl α-cyanoacrylate and 3 g of the mixture obtained was charged into an aluminum tube, and the test of expediting gellation of an adhesive was conducted in a thermoregulator at a temperature of 70° C.

RESULTS

According to the test, AEROSIL R 972 and R 971 consisting of fumed silica treated with dimethyldichlorosilane were superior in stability to other kinds of fumed silica. The product which showed stability for twenty days in the test of expediting gellation at 70° C. is supposed from experiment to show stability for more than six months at room temperature.

EXAMPLE 1

TABLE 2-1

Example 1

| | Generic name | Concrete name | Contrast example | Example | | | | |
|---|---|---|---|---|---|---|---|---|
| Composition of matter | α-cyanoacrylate | Cyanon 5 MSP | 100 | 100 | 100 | 100 | 100 | 100 |
| | Fumed silica | Aerosil R 972 | 10 | 10 | 10 | 10 | 10 | 10 |
| | Borate | TMB | 0 | 0.01 | 0.1 | 0.5 | 1 | 5 |
| Physical properties | | Viscosity (CPS) | | | | | | |
| | | 2.5 rpm | 73,200 | 120,000 | 168,000 | 256,000 | 302,400 | 297,600 |
| | | 20.0 rpm | 24,400 | 32,200 | 40,000 | 55,000 | 63,000 | 62,000 |
| | | T.I. | 3.0 | 3.7 | 4.2 | 4.7 | 4.8 | 4.8 |
| | | Tensile shearing strength (kg/cm²) | 240 | 240 | 235 | 230 | 240 | 235 |
| | | Set time (second) | 90 | 100 | 100 | 100 | 100 | 100 |
| | | Stability at 70° C. (day) | 10 | 20 | 40 | 60 | 60 | 60 |

TABLE 2-2

| | Generic name | Concrete name | Contrast example | Example | | | | |
|---|---|---|---|---|---|---|---|---|
| Composition of matter | α-cyanoacrylate | Cyanon 5 MSP | 100 | 100 | 100 | 100 | 100 | 100 |
| | Fumed silica | Cab-O-Sil N70-TS | 10 | 10 | 10 | 10 | 10 | 10 |
| | Borate | TMB | 0 | 0.01 | 0.1 | 0.5 | 1 | 5 |
| Physical properties | | Viscosity (CPS) | | | | | | |
| | | 2.5 rpm | 200,900 | 196,000 | 158,400 | 105,600 | 84,000 | 72,200 |
| | | 20.0 rpm | 49,000 | 49,000 | 48,000 | 48,000 | 40,000 | 38,000 |
| | | T.I. | 4.1 | 4.0 | 3.3 | 2.2 | 2.1 | 1.9 |
| | | Tensile shearing strength (kg/cm²) | 230 | 230 | 220 | 220 | 230 | 220 |
| | | Set time (second) | 90 | 100 | 100 | 100 | 100 | 100 |

TABLE 2-2-continued

| Generic name | Concrete name | Contrast example | Example | | | |
| --- | --- | --- | --- | --- | --- | --- |
| | Stability at 70° C. (day) | 5 | 10 | 20 | 20 | 20 | 20 |

NOTES (1) TMB:
Boric acid trimethyl ester
(2) Viscosity:
Measured by Brookfield rotary viscometer
(3) T.I.:T.I.=thixotropy index expressed by viscosity (2.5 rpm)/viscosity (20 rpm)
(4) Tensile shearing strength:
Based on JIS K6861. The materials attached to each other were steel.
(5) Set time:
Based on JIS K6861, and the materials attached to each other were steel. To 100 parts by weight of CYANON 5 MSP were added 10 parts by weight of AEROSIL R 972 consisting of fumed silica treated with dimethyldichlorosilane and parts by weight of TMB as each specified in Table 2-1 and were mixed.

RESULTS

The adhesive having no TMB added thereto was low both in viscosity and in thixotropy index and the gellation acceleration test at 70° C. showed that the adhesive had storage stability effective for 10 days but that the adhesive was increased both in viscosity and T.I. by addition of TMB, improving in thixotropy and acquiring fluidity having a less tendency to hang from the surface to which the adhesive was applied. The test also showed that the adhesive thus obtained was greatly improved in stability.

Likewise, to 100 parts by weight of CYANON 5 MSP were added 10 parts by weight of Cab-O-sil N 70-TS consisting of fumed silica treated with poly dimethylsiloxane and a number of parts by weight of TMB as each specified in Table 2-2 and were mixed. Addition of TMB showed reduction in T.I. but no such degree of improvement as that in the case of AEROSIL R 972 was noticed also in the gelletion acceleration test at 70° C.

EXAMPLE 2

| | | Test 3 | | | |
| --- | --- | --- | --- | --- | --- |
| Generic name | Concrete name | Contrast example | Example | | |
| α-cyano-acrylate | Silica 5 MSP | 100 | 100 | 100 | 100 |
| Fumed silica | Aerosil R 972 | 0 | 5 | 10 | 15 |
| Borate | TMB | 0 | 0.5 | 0.5 | 0.5 |
| Physical properties | Viscosity (CPS) 2.5 rpm | 50 | 3,800 | 256,000 | 529,000 |
| | 20.0 rpm | 50 | 1,250 | 55,000 | 115,000 |
| | T. I. | 1.0 | 3.0 | 4.7 | 4.6 |
| | Tensile shearing strength (kg/cm$^2$) | 240 | 240 | 230 | 230 |
| | Set time (second) | 80 | 90 | 100 | 100 |
| | Stability at 70° C. (day) | 50 | 60 | 60 | 60 |

TEST

To 100 parts by weight of CYANON 5 MSP were added AEROSIL R 972 consisting of fumed silica treated with dimethyldichlorosilane and TMB in their respective numbers of parts by weight as specified in Table 3 and were mixed.

RESULTS

The adhesive composition of matter whose viscosity ranges from 1250 to 115000 CPS/20 rpm was obtained from a mixture in the range of 0.5 parts by weight of TMB and 5-15 parts by weight of AEROSIL R 972, and showed an excellent thixotropy and fluidity having a less tendency to hang from the surface to which the adhesive was applied. The gellation acceleration test at 70° C. also showed a very good result with a storage stability of 60 days.

EXAMPLE 3

TABLE 4

| Generic name | Concrete name | Example | | | | |
| --- | --- | --- | --- | --- | --- | --- |
| α-cyano-acrylate | Cyanon 5 MSP | 100 | 100 | 100 | 100 | 100 |
| Fumed silica | Aerosil R 972 | 10 | 10 | 10 | 10 | 10 |
| Borate | TMB | 0.5 | — | — | — | — |
| | TEB | — | 0.5 | — | — | — |
| | TBB | — | — | 0.5 | — | — |
| | TOB | — | — | — | 0.5 | — |
| Physical properties | Viscosity (CPS) | | | | | |
| | 2.5 rpm | 256,000 | 272,000 | 238,500 | 160,000 | 73,200 |
| | 20.0 rpm | 55,000 | 59,000 | 53,000 | 40,000 | 24,400 |
| | T. I. | 4.7 | 4.6 | 4.5 | 4.0 | 3.0 |
| | Tensile shearing strength (kg/cm$^2$) | 230 | 230 | 240 | 210 | 240 |
| | Set time (second) | 100 | 100 | 100 | 100 | 90 |

NOTES (1) TEB . . . boric acid triethyl ester
(2) TBB . . . boric acid tri-n-butyl ester
(3) TOB . . . boric acid tri-n-octadecyl ester

TEST

To 100 parts by weight of CYANON 5 MSP were added 10 parts by by weight of AEROSIL R 972 consisting of fumed silica treated with dimethyldichlorosilane and 0.5 parts by weight of various kinds, respectively of trialkyl borate in Table 4 and were mixed.

RESULTS

The adhesive composition of matter having trialkyl borate added thereto was invariably high in viscosity and high in thixotropy and showed fluidity having a less tendency to hang down in comparison with that to which no trialkyl borate was added. The gellation acceleration test at 70° C. also showed that the composition of matter obtained was greatly improved in stability.

As apparent from the description and examples given above, the invention provides the advantage that thixotropy high in stability has been imparted to the composition of matter according to the invention by adding trialkyl borate and fumed silica treated with dimethyl dichlorosilane to α-cyanoacrylate. The invention has made it possible to greatly improve the ineffective workability and restrictions on the range of work which were considered problems of conventional α-cyanoacrylate adhesives.

We claim:

1. An α-cyanoacrylate adhesive composition of matter consisting essentially of α-cyanoacrylate, fumed silica having a surface treated with a dimethyldichlorosilane, and trialkyl borate, said trialkyl borate being represented by the general formula $B(OR)_3$ wherein R represents any alkyl group having 1 through 18 carbon atoms contained therein.

2. An α-cyanoacrylate adhesive composition of matter according to claim 1, wherein said fumed silica is present at levels of 5–15% by weight, said trialkyl borate is present at levels of 0.01–10% by weight and the balance is α-cyanoacrylate.

3. An α-cyanoacrylate adhesive composition of matter according to claim 2, wherein said trialkyl borate is present at levels of 0.1–5.0% by weight.

4. An α-cyanoacrylate adhesive composition of matter wherein said trialkyl borate is selected from the group consisting of boric acid trimethyl ester, boric acid triethyl ester, boric acid tri-n-butyl ester and boric acid tri-n-octadecyl ester.

* * * * *